(12) United States Patent
Kurisu et al.

(10) Patent No.: US 6,254,847 B1
(45) Date of Patent: Jul. 3, 2001

(54) METAL HYDROXIDE SOLID SOLUTION, METAL OXIDE SOLID SOLUTION AND PROCESSES FOR THEIR PRODUCTION

(75) Inventors: Hirofumi Kurisu; Ryuichi Ishibashi; Toshikazu Kodani; Mareshi Takegaki, all of Hyogo (JP)

(73) Assignee: Tateho Chemical Industries Co., Ltd., Ako (JP)

( * ) Notice: Subject to any disclaimer, the term of this patent is extended or adjusted under 35 U.S.C. 154(b) by 0 days.

(21) Appl. No.: 09/060,213

(22) Filed: Apr. 15, 1998

(30) Foreign Application Priority Data

Apr. 15, 1997 (JP) .................................................. 9-114305

(51) Int. Cl.$^7$ .......................... C01G 45/00; C01G 49/00; C01G 51/00; C01G 53/00; C01F 5/00
(52) U.S. Cl. ........................... 423/593; 423/594; 423/599
(58) Field of Search .................................. 423/593, 594, 423/599

(56) References Cited

U.S. PATENT DOCUMENTS 5,264,284 * 11/1993 Miyata .................................. 423/635
5,344,636 * 9/1994 Miyata .................................. 423/593
5,401,442   3/1995 Miyata .
5,571,526  11/1996 Miyata .
5,759,509   6/1998 Miyata et al. .
5,766,568   6/1998 Kurisu et al. .

FOREIGN PATENT DOCUMENTS 0498566  8/1992 (EP) .
0666238  8/1995 (EP) .
0732302  9/1996 (EP) .

* cited by examiner

Primary Examiner—Steven Bos
(74) Attorney, Agent, or Firm—Armstrong, Westerman, Hattori, McLeland & Naughton, LLP

(57) ABSTRACT

A metal hydroxide solid solution and a metal oxide solid solution, wherein the crystal form is an octahedron comprising upper and lower parallel basal planes and six peripheral pyramidal planes, the pyramidal planes consisting of upward-inclined planes and downward-inclined planes which are alternatively located. The ratio of the major axis diameter of the basal plane to the thickness between the upper and lower basal planes (major axis diameter/thickness) if 1 to 9. This improves fluidity, processability and the like when the solid solutions are kneaded into resins and the like.

24 Claims, 8 Drawing Sheets

METAL HYDROXIDE SOLID SOLUTION, METAL OXIDE SOLID SOLUTION AND PROCESSES FOR THEIR PRODUCTION

FIELD OF THE INVENTION

The present invention relates to a magnesium hydroxide solid solution, a magnesium oxide solid solution and processes for their production.

PRIOR ART

In conventional magnesium hydroxides, fine crystals are formed in aggregates having an average secondary particle diameter of about 10 to 100 micrometers. Magnesium oxide formed by using such aggregates as materials have not been homogeneous in terms of particle diameter. For this reason, when the above magnesium hydroxides and magnesium oxides are used as additives for resins, there are disadvantages in that they exhibit poor dispersibility, do not function sufficiently as additives, and tend to destroy physical properties inherent in resins themselves.

To solve the above-described problems, a method of manufacturing a magnesium hydroxide which has good crystal growth (Japanese Patent Publication No. 48809/88) and a method of manufacturing a magnesium oxide having high dispersibility (Japanese Patent Provisional Publication No. 141418/90) have been proposed. Moreover, a magnesium hydroxide solid solution and a magnesium oxide solid solution showing high performance (Japanese Patent Provisional Publications Nos. 41441/94, 209084/93 and 157032/94) have been proposed, in which effects to some extent have been produced. In addition, as large particles for improving mechanical properties and the like, a magnesium hydroxide solid solution and a magnesium oxide solid solution having high aspect ratios have been proposed (Japanese Patent Provisional Publication No. 259235/96).

However, the above-mentioned conventional magnesium hydroxides, magnesium oxides, magnesium hydroxide solid solutions, magnesium oxide solid solutions, and magnesium hydroxide and magnesium oxide solid solutions having high aspect ratios are crystals having a thin and hexagonal-prism-like form, although their crystal sizes vary from small to large. Therefore, when they are kneaded into synthetic resins as additives, problems may be caused such as productivity deteriorates and high density filling cannot be performed due to increase in viscosity of the resins, as well as deterioration in fluidity and processability and a low speed molding. Besides, depending on the resins used, dispersibility in the resins may deteriorate due to factors concerning the shapes of the above solid solutions so that, occasionally, they do not function sufficiently as additives.

SUMMARY OF THE INVENTION

The present invention was made under such circumstances. The present invention aims to provide a metal hydroxide solid solution and a metal oxide solid solution which are improved in terms of fluidity, processability and the like when kneaded into resins and the like, and processes for their production.

To accomplish the above aim, it is in aspect of the present invention to provide a metal hydroxide solid solution represented by the following formula (1);

$$Mg_{1-x}M^{2+}_{x}(OH)_2 \tag{1}$$

wherein $M^{2+}$ denotes at least one divalent metal ion selected from $Mn^{2+}$, $Fe^{2+}$, $Co^{2+}$, $Ni^{2+}$, $Cu^{2+}$ and $Zn^{2+}$ and x denotes a number in the range of $0.01 \leq x < 0.5$, with a crystal form which is an octahedron comprising upper and lower parallel basal planes and six peripheral pyramidal planes, the pyramidal planes consisting of upward-inclined planes and downward-inclined planes which are alternatively located, the ratio of the major axis diameter of the basal plane to the thickness between the upper and lower basal planes (major axis diameter/thickness) being 1 to 9.

It is another aspect of the present invention to provide a metal oxide solid solution represented by the following formula (2):

$$Mg_{1-x}M^{2+}_{x}O \tag{2}$$

wherein $M^{2+}$ denotes at least one divalent metal ion selected from $Mn^{2+}$, $Fe^{2+}$, $Co^{2+}$, $Ni^{2+}$, $Cu^{2+}$ and $Zn^{2+}$ and x denotes a number in the range of $0.01 \leq x < 0.5$, with a crystal form which is an octahedron comprising upper and lower parallel basal planes and six peripheral pyramidal planes, the pyramidal planes consisting of upward-inclined planes and downward-inclined planes which are alternatively located, the ratio of the major axis diameter of the basal plane to the thickness between the upper and lower basal planes (major axis diameter/thickness) being 1 to 9.

It is still another aspect of the present invention to provide a process for producing metal hydroxide solid solution in which composite metal oxide represented by the following formula (3) is hydrated in an aqueous medium, in which 0.1 to 6 mol %, based on the composite metal oxide, of at least one selected from carboxylic acid, metal salt of carboxylic acid, inorganic acid and metal salt of inorganic acid coexists, with strong stirring.

$$Mg_{1-x}M^{2+}_{x}O \tag{3}$$

wherein $M^{2+}$ denotes at least one divalent metal ion selected from $Mn^{2+}$, $Fe^{2+}$, $Co^{2+}$, $Ni^{2+}$, $Cu^{2+}$ and $Zn^{2+}$ and x denotes a number in the range of $0.01 \leq x < 0.5$.

It is even still another aspect of the present invention to provide a process for producing metal oxide solid solution in which the metal hydroxide solid solution obtained by the above process is burned at not less than 400° C.

As described heretofore, in the metal hydroxide solid solution according to the present invention, the crystal form is an octahedron comprising upper and lower parallel basal planes and six peripheral pyramidal planes, the pyramidal plane consisting of upward-inclined planes and downward-inclined planes which are alternatively located, and the ratio of the major axis diameter of the basal plane to the thickness between the upper and lower basal planes (major axis diameter/thickness) is 1 to 9. Therefore, in the present invention, the crystal form has a completely different crystal habit from the thin and hexagonal-prism crystal of the conventional metal hydroxide solid solution, and, in addition, crystal growth in the direction of the thickness is high. For this reason, unlike the conventional metal hydroxide solid solutions, when the metal hydroxide solid solution of the present invention is kneaded into a synthetic resin as an additive, fluidity and processability of the resin are improved and the molding speed is improved, by which productivity becomes excellent while the filling property is also improved. As a result, dispersibility in the resin becomes good, and when the metal hydroxide solid solutions of the present invention are used as additives for flame retardants, ultraviolet ray absorbents, reinforcing materials, radiating agents and the like, for resins, they may exhibit those functions sufficiently.

With respect to the metal hydroxide solid solution according to the present invention, in the case that the major axis diameter of the basal plane is 0.1 to 10 μm in average, when such is kneaded into a synthetic resin as an additive, fluidity and processability are further improved so that productivity in resin molding and the like becomes excellent.

With respect to the metal hydroxide solid solution according to the present invention, in the case where $M^{2+}$ in the above formula (1) is $Zn^{2+}$, the degree of whiteness is improved and also ultraviolet ray absorbency becomes excellent by solid-soluting $Zn^{2+}$ in $Mg(OH)_2$.

In addition, in the metal oxide solid solution according to the present invention, as in the above-described metal hydroxide solid solution, the crystal form is an octahedron comprising upper and lower parallel basal planes and six peripheral pyramidal planes, the pyramidal planes consisting of upward-inclined planes and downward-inclined planes which are alternatively located, and the ratio of the major axis diameter of the basal plane to the thickness between the upper and lower basal planes (major axis diameter/ thickness) is 1 to 9. Therefore, in the present invention, the crystal form has a completely different crystal habit from those of the conventional oxide and metal hydroxide, and, in addition, crystal growth in the direction of the thickness is excellent. For this reason, unlike the conventional metal oxide solid solutions, when the metal oxide solid solution of the present invention is kneaded into a synthetic resin as an additive, fluidity and processability of the resin are improved and the molding speed is improved, by which productivity becomes excellent while the filling property is also improved. As a result, dispersibility in the resin becomes better, and when the metal oxide solid solution of the present invention are used as additives for flame retardants, ultraviolet ray absorbents, reinforcing materials, radiating agents and the like, for resins, they may exhibit those functions sufficiently.

With respect to the metal oxide solid solution according to the present invention, in the case that the major axis diameter of the basal plane is 0.1 to 10 μm in average, when such is kneaded into a synthetic resin as an additive, fluidity and processability are further improved so that productivity in resin molding and the like becomes excellent.

With respect to the metal oxide solid solution according to the present invention, in the case where $M^{2+}$ in the above formula (2) is $Zn^{2+}$, the degree of whiteness is improved and also the ultraviolet ray absorbency becomes excellent by solid-soluting $Zn^{2+}$ in MgO.

Embodiments of the present invention will hereinafter be described in detail.

A metal hydroxide solid solution according to the present invention is represented by the following formula (1), wherein divalent metal ions denoted by $M^{2+}$ are solid-soluted in $Mg(OH)_2$. In the formula (1), x denotes a number in the range of $0.01 \leq x < 0.5$. Such a metal hydroxide solid solution has the same crystal habit as that of magnesium hydroxide and has a cadmium iodate type habit of hexagonal system.

$$Mg_{1-x}M^{2+}_x(OH)_2 \qquad (1)$$

In addition, a metal oxide solid solution according to the present invention is represented by the following formula (2), wherein divalent metal ions denoted by $M^{2+}$ are solid-soluted in MgO. In the formula (2), x denotes a number in the range of $0.01 \leq x < 0.5$. Such a metal oxide solid solution has the same crystal habit as that of standard magnesium oxide and has a sodium chloride type habit of cubic system. However, it is an oxide maintaining a skeleton of the above hydroxide solid solution.

$$Mg_{1-x}M^{2+}_x O \qquad (2)$$

In the above formulae (1) and (2), $M^{2+}$ denotes at least one divalent metal ion selected from $Mn^{2+}$, $Fe^{2+}$, $Co^{2+}$, $Ni^{2+}$, $Cu^{2+}$ and $Zn^{2+}$. Among those divalent metal ions, $Zn^{2+}$ is particularly preferred since solid-soluting $Zn^{2+}$ in $Mg(OH)_2$ or MgO improves the degree of whiteness as well as imparts an excellent ultraviolet ray absorbency to the solid solutions.

In addition, the crystal habit of each of the metal hydroxide solid solution and the metal oxide solid solution according to the present invention is an octahedron comprising upper and lower parallel basal planes and six peripheral pyramidal planes, the pyramidal planes consisting of upward-inclined planes and downward-inclined planes which are alternatively located.

Figure 1A:
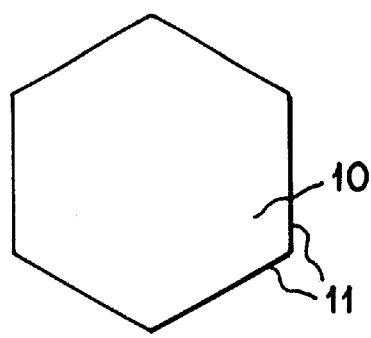
FIG. 1(a) shows a plan view and FIG. 1(b) shows a side view of the crystal form of a conventional metal hydroxide solid solution.
Figure 1B:
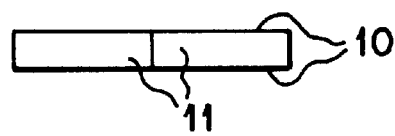

In further detail, conventional magnesium hydroxide and magnesium hydroxide solid solution have crystal habits of hexagonal system, and, as shown in FIGS. 1(a) and (b), they have a hexagonal-prism form whose periphery is surrounded by upper and lower planes 10 shown as a (00·1) plane according to Miller and Bravais indices and six prismatic planes 11 belonging to a plane of a form of {10·0}. They also have a thin and hexagonal-prism form since crystal growth in the direction of [001] (C-axis) is lower.

Figure 2A:
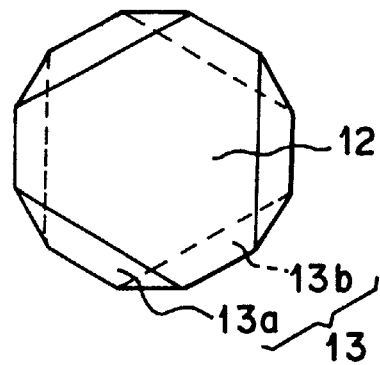
FIG. 2(a) shows a plan view and FIG. 2(b) shows a side view of one example of a crystal form of a metal hydroxide solid solution according to the present invention.
Figure 2B:
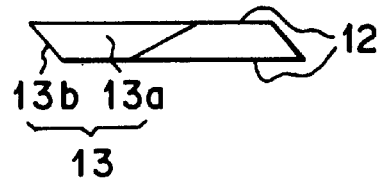
Figure 3A:
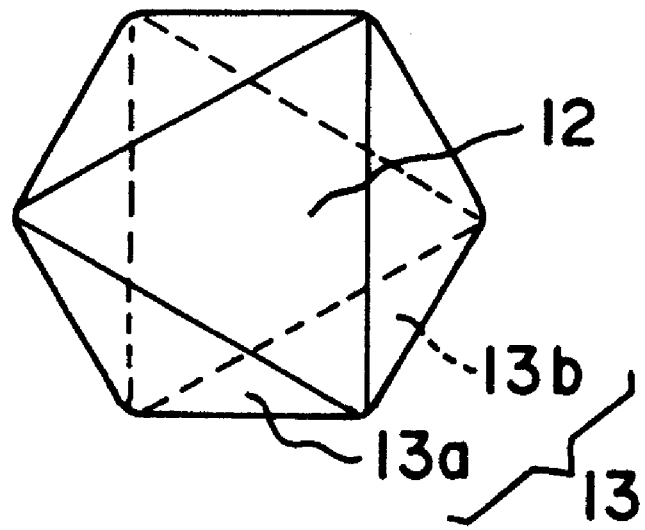
FIG. 3(a) shows a plan view and FIG. 3(b) shows a side view of another example of a crystal form of a metal hydroxide solid solution according to the present invention.
Figure 3B:
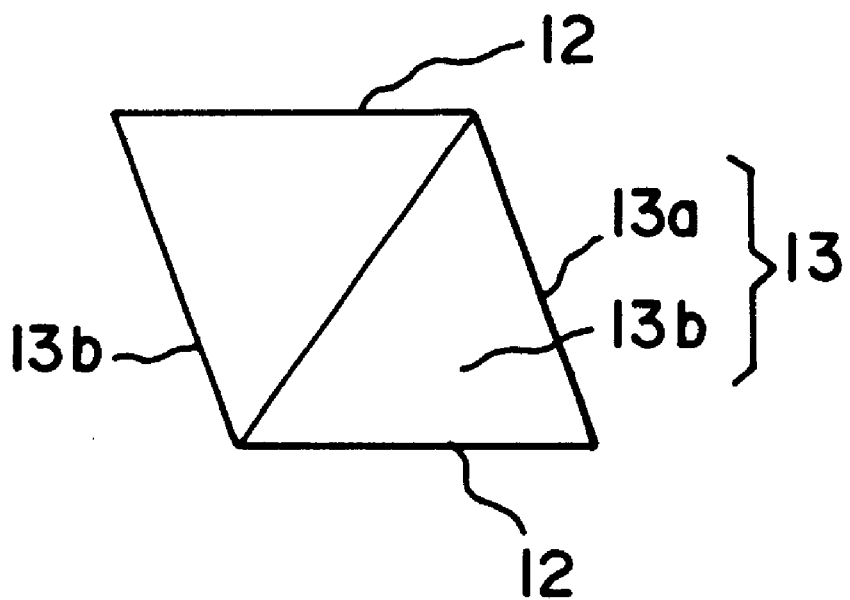

On the other hand, regarding the metal hydroxide solid solution and the metal oxide solid solution according to the present invention, as shown in FIGS. 2(a) and (b), each of their peripheries is surrounded by upper and lower planes 12 shown as a (00·1) plane and six pyramidal planes 13 belonging to a plane of a form of {10·1}, due to crystal habit control in crystal growth. The pyramidal planes 13 consist of upward-inclined planes 13a of a (10·1) plane and the like and downward-inclined planes 13b of a (10·-1) plane and the like which are alternatively located, thereby providing an octahedron having an unique crystal habit. Moreover, compared with the conventional crystals, crystal growth in the C-axis direction is higher. Shown in FIG. 2(b) is a crystal having an approximate plate-like form. Shown in FIGS. 3(a) and (b) is a crystal in which crystal growth in the C-axis direction further proceeds so that the crystal habit conspicuously appears and the crystal becomes isotropic. Thus, the metal hydroxide solid solution and the metal oxide solid solution according to the present invention include crystals having a regular octahedron form. Namely, it is preferable that the ratio of the major axis diameter of the basal plane to the thickness between the upper and lower basal planes (major axis diameter/thickness) is 1 to 9. A more preferable upper limit for the ratio of the major axis diameter to the thickness is 7. Regarding Miller and Bravais indices, "1 bar" is shown as "−1".

The fact that the six planes surrounding each periphery of the metal hydroxide solid solution and the metal oxide solid solution of the present invention are the pyramidal planes belonging to {10·1}, as described above, is known from the following. Namely, when observed with a scanning electron microscope from the direction of the C-axis, crystals of the metal hydroxide solid solution and the metal oxide solid solution of the present invention show a three-fold rotation symmetry in which the rotation axis is C-axis. Moreover, the values in terms of angles between the (10·1) planes and the {10·1} planes calculated by using the measured values of lattice constant according to a powder X-ray diffraction are almost the same as the measured values in terms of the angles according to the observations with the scanning electron microscope.

In addition, regarding the metal hydroxide solid solution and the metal oxide solid solution of the present invention, a ratio of a half width $B_{110}$ of a peak for a (110) plane according to the powder X-ray diffraction and a half width $B_{001}$ of a peak for a (001) plane ($B_{110}/B_{001}$) is not less than 1.4. It is confirmed, from the above, that the crystallinity in the direction of C-axis is good and the thickness has grown. That is, in crystals of the conventional magnesium hydroxide and the like, the crystals have not grown in the direction of C-axis and the peaks for the (001) planes are broad so that the half widths $B_{001}$ become wider, thereby making ($B_{110}/B_{001}$) values small. On the contrary, in the metal hydroxide solid solution and the metal oxide solid solution of the present invention, since the crystallinity in the direction of C-axis is good, the peaks for the (001) planes become sharp and fine so that the half widths $B_{001}$ become narrower. As a result, the ($B_{110}/B_{001}$) values become high.

Namely, the metal hydroxide solid solution and the metal oxide solid solution of the present invention have the crystal forms having completely different crystal habits from those of the conventional ones, and the crystal growth in the direction of C-axis is conspicuous. Thus, the solid solutions of the present invention have novel crystal shapes which have not conventionally been seen.

Average particle diameters of the metal hydroxide solid solution and the metal oxide solid solution of the present invention are preferably in the range from 0.1 to 10 μm. A more preferable lower limit of the average particle diameter is 0.5 μm, and 1 μm is most preferable. A more preferable upper limit of the average particle diameter is 5 μm, and 3 μm is most preferable. Moreover, it is preferable that there be little secondary aggregation.

The metal hydroxide solid solution according to the present invention may be produced, for example, in the following manner. First, a water soluble $M^{2+}$ compound is added to an aqueous solution of magnesium hydroxide so as to prepare partially-solid-soluted hydroxide as raw material. The thus obtained raw material then is burned at a temperature ranging from 800 to 1500° C., preferably from 1000 to 1300° C. so as to prepare a composite metal oxide. The resultant composite metal oxide may be represented by the following formula (3), and has a BET specific surface area of not more than 10 m²/g, preferably not more than 5 m²/g.

$$Mg_{1-x}M^{2+}_xO \qquad (3)$$

The metal hydroxide solid solution of the present invention may be obtained by hydrating the composite metal oxide in a system of an aqueous medium, in which about 0.1 to 6 mol %, based on the composite metal oxide, of at least one of carboxylic acid, metal salt of carboxylic acid, inorganic acid and metal salt of inorganic acid coexists, with strong stirring at a temperature of not less than 40° C.

In the above formula (3), $M^{2+}$ denotes at least one divalent metal ion selected from $Mn^{2+}$, $Fe^{2+}$, $Co^{2+}$, $Ni^{2+}$, $Cu^{2+}$ and $Zn^{2+}$. Especially, $Zn^{2+}$ is preferable among them.

In the above manner, the raw material is not limited to the partially-solid-soluted hydroxide obtained in the above-described method. Any raw materials, with which composite metal oxide can be obtained by burning, are included. For example, there may be a composite metal hydroxide obtained by a coprecipitation method, a mixture of one kind selected from magnesium hydroxide, magnesium oxide and magnesium carbonate and one kind selected from $M^{2+}$ hydroxide, $M^{2+}$ oxide and $M^{2+}$ salts, and the like. As to stirring in the above hydration reaction, in view of improving homogeneity and dispersibility, as well as improving efficient contact with carboxylic acid, inorganic acid and/or their metal salt(s), and the like, a strong stirring is preferable, and a strong high shear stirring is more preferable. It is preferable to perform such stirring with, for example, a rotating blade-type stirrer at a rotating tip speed for moving blades of not less than 5 m/s. It is more preferable to rotoate at not less than 7 m/s. Besides, it is preferable to use a turbine blade shape, a DS impeller blade shape or the like, which is strong in shearing, as a shape for the stirring blade.

Regarding the carboxylic acids, there are no specific restrictions as to the types of the carboxylic acids which can be used. For example, they may include monocarboxylic acids, oxycarboxylic acids (oxyacids) and the like. The monocarboxylic acids may include, for example, formic acid, acetic acid, propionic acid, butyric acid, valeric acid, caproic acid, acrylic acid, crotonic acid and the like. The oxycarboxylic acids (oxyacids) may include, for example, glycolic acid, lactic acid, hydroacrylic acid, α-oxybutyric acid, glyceric acid, salicylic acid, benzoic acid, gallic acid and the like. Regarding the metal salts of the carboxylic acids, there are no specific restriction to the types of the metal salts. Preferably, they may be magnesium acetate, zinc acetate and the like.

Regarding the inorganic acids, there are no specific restriction as to the type of the inorganic acids which can be used. Preferably, they may be nitric acids, hydrochloric acids and the like. And regarding the metal salts of the inorganic acids, there are no specific restriction as to the types of the metal salts. Preferably, they may be magnesium nitrate, zinc nitrate and the like.

The metal oxide solid solution of the present invention may be produced by burning the metal hydroxide solid solution obtained in the above manner at about not less than 400° C., preferably at 500 to 1200° C.

The metal hydroxide solid solution and the metal oxide solid solution of the present invention may exhibit functions such as affinity for resins, acid resistance, water repellency, ultraviolet ray absorbency and the like by being subjected to a variety of surface treatments. The metal hydroxide solid solution and the metal oxide solid solution of the present invention have good dispersibility in resins as described above and, even if the functions are imparted by surface treatments, they may exhibit those functions sufficiently.

The surface treatment agents for improving the affinity of the solid solutions for resins may, for example, include a higher fatty acid and its alkali metal salt, phosphoric ester, silane coupling agents, fatty acid esters of polyhydric alcohol, and the like. In order to improve acid resistance, water repellency and the like, for example, a silica coating in which methyl silicate and/or ethyl silicate are hydrolyzed, silicic acid metallic salt coating in which burning at about 500 to 1000° C. is conducted after silica coating, coatings with silicone oil, polyfluoroalkyl phosphate and the like are conducted. In order to improve the ultraviolet ray absorbency, for example, titanyl sulfate is hydrolyzed and titanium dioxide coating is conducted.

The present invention will hereinafter be explained by reference to the following Examples and Comparative Examples.

EXAMPLE 1

20 liters of a mixed solution of magnesium nitrate and zinc nitrate ($Mg^{2+}$=1.6 mol/liter and $Zn^{2+}$=0.4 mol/liter) were poured into a 50-liter reaction vessel, and 20 liters of $Ca(OH)_2$ (2.0 mol/liter) were added thereto with stirring for reaction. The thus obtained white precipitate then was filtered, washed with water and dried. The dried material was milled with a ball mill and burned in an electric furnace for 2 hours at 1200° C. The burned material was milled with the ball mill and passed through a 200-mesh sieve by a wet method. The resultant burned material was added to a 20-liter vessel containing 10 liters of acetic acid (0.01 mol/liter) in such a manner that the oxide concentration was 100 g/liter. The resultant material was stirred with a high-speed stirrer (Homomixer, manufactured by Tokusyu Kika Kogyo Co., Ltd.) at a rotating speed for turbine blades of 10 m/s, and subjected to hydration treatment for 4 hours at 90° C. The reactant was passed through a 500-mesh sieve, and subsequently was filtered, washed with water and dried so as to produce a metal hydroxide solid solution of the present invention.

Figure 4:
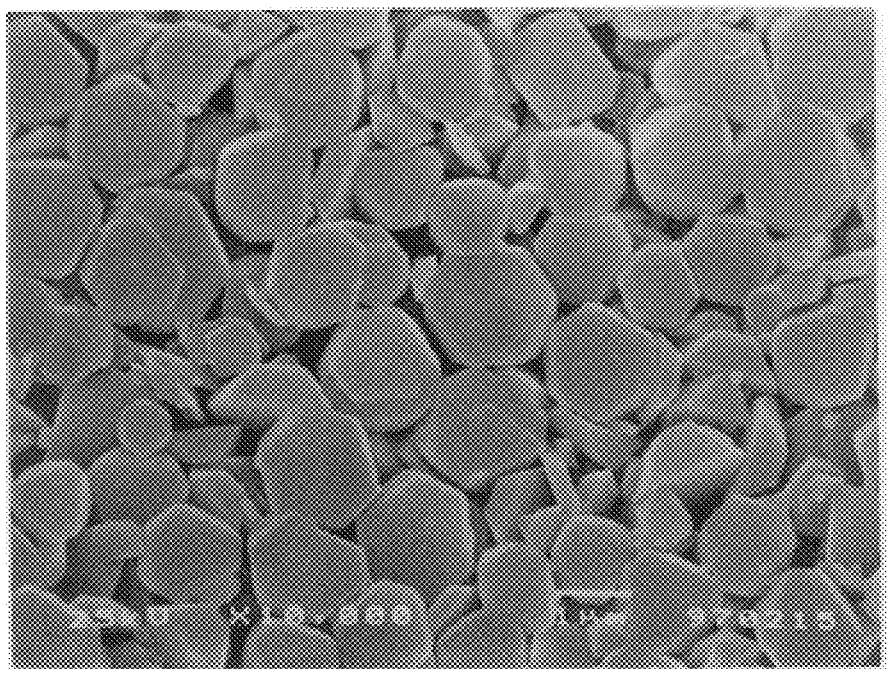
FIG. 4 is a scanning electron microphotograph showing the metal hydroxide solid solutions of Example 1.

As a result of observations with a scanning electron microscope, the resultant metal hydroxide solid solution crystal was octahedral in shape having pyramidal planes on their periphery. The major axis diameter of the basal plane was about 1.2 μm and the thickness between the basal planes was about 0.36 μm. Therefore, the ratio of the major axis diameter to the thickness (major axis diameter/thickness) was 3.3. The scanning electron microphotograph of the above metal hydroxide solid solution is shown in FIG. 4. In addition, as a result of a powder X-ray diffraction on the metal hydroxide solid solution, the diffraction pattern thereof was the same as that of magnesium hydroxide except that the diffraction pattern slightly shifted to a lower angle side. Consequently, it is found that the solid solution had a cadmium hydroxide type habit of a hexagonal system.

EXAMPLE 2

20 liters of a magnesium hydroxide slurry ($Mg(OH)_2$ 100 g/liter) were poured into a 30-liter reaction vessel, and 3.4 liters of $ZnCl_2$ (2.0 mol/liter) were added thereto with stirring for reaction. The thus obtained white precipitate then was filtered, washed with water and dried. The dried material was milled with a ball mill and burned in an electric furnace for 2 hours at 1100° C. The burned material was milled with the ball mill and passed through a 500-mesh sieve by a wet method. The resultant burned material was added to a 20-liter vessel containing 10 liters of acetic acid (0.03 mol/liter) in such a manner that the oxide concentration was 100 g/liter. The resultant material was stirred with an edge turbine blade-type stirrer at a rotating speed for edge turbine blades of 12 m/s, and subjected to hydration treatment for 6 hours at 90° C. The reactant was passed thorough the 500-mesh sieve, and subsequently was filtered, washed with water and dried so as to produce a metal hydroxide solid solution of the present invention.

Figure 5:
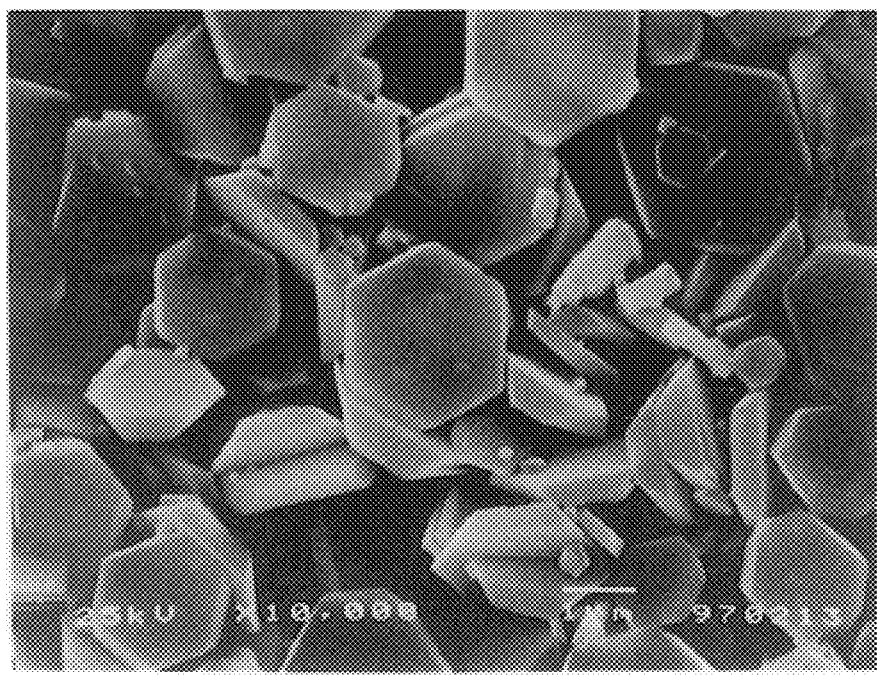
FIG. 5 is a scanning electron microphotograph showing the metal hydroxide solid solution of Example 2.

As a result of observations with a scanning electron microscope, the resultant metal hydroxide solid solution crystal was an octahedron in shape having pyramidal planes on its periphery. The major axis diameter of a basal plane was about 2.4 μm and the thickness between the basal planes was about 0.37 μm. Therefore, the ratio of the major axis diameter to the thickness (major axis diameter/thickness) was 6.5. The scanning electron microphotograph of the above metal hydroxide solid solution is shown in FIG. 5. In addition, as a result of a powder X-ray diffraction on the metal hydroxide solid solution, the diffraction pattern thereof was the same as that of magnesium hydroxide except that the diffraction pattern slightly shifted to a lower angle side. Consequently, it is found that the solid solution had a Cadmium hydroxide type habit of hexagonal system.

EXAMPLE 3

20 liters of a mixed solution of magnesium nitrate and zinc nitrate ($Mg^{2+}$=1.6 mol/liter and $Zn^{3+}$=0.4 mol/liter) were poured into a 50-liter reaction vessel, and 20 liters of $Ca(OH)_2$ (2.0 mol/liter) were added thereto with stirring for reaction. The thus obtained white precipitate then was filtered, washed with water and dried. The dried material was milled with a ball mill and burned in an electric furnace for 2 hours at 1200° C. The burned material was milled with the ball mill and passed through a 200-mesh sieve by a wet method. The resultant burned material was added to a 20-liter vessel containing 10 liters of n-butyric acid (0.08 mol/liter) in such a manner that the oxide concentration was 100 g/liter. The resultant material was stirred with a high-speed stirrer (Homomizer, manufactured by Tokusyu Kika Kogyo Co., Ltd.) at a rotating speed for turbine blades of 10 m/s, and subjected to hydration treatment for 4 hours at 90° C. The reactant was passed through a 500-mesh sieve, and subsequently was filtered, washed with water and dried so as to produce a metal hydroxide solid solution of the present invention.

Figure 6:
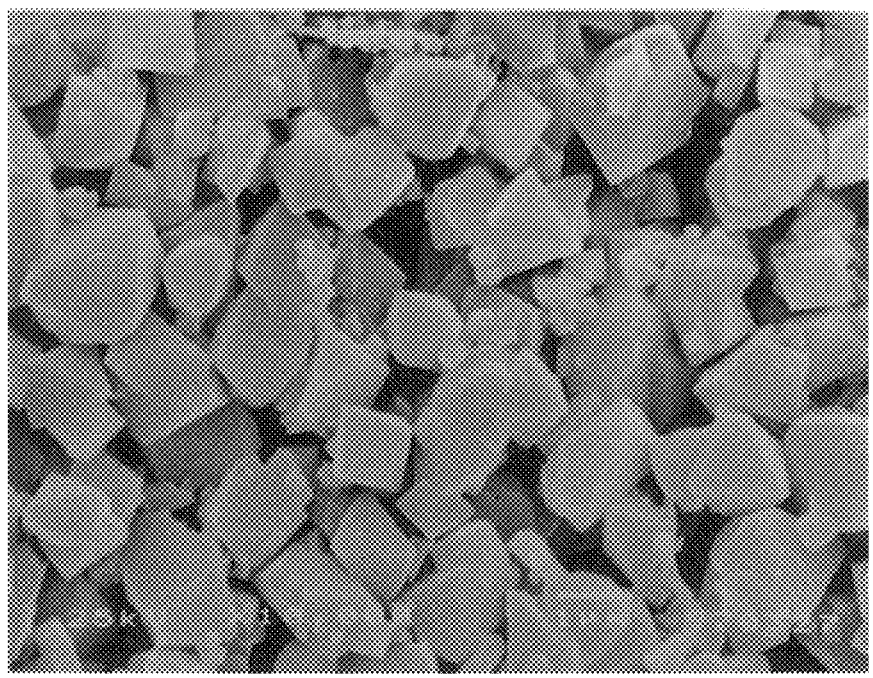
FIG. 6 is a scanning electron microphotograph showing the metal hydroxide solid solution of Example 3.

As a result of observations with a scanning electron microscope, the resultant metal hydroxide solid solution crystal was an approximate regular octahedron in shape, with the major axis diameter of the basal plane about 2.5 μm and the thickness between the basal planes about 2.2 μm. Therefore, the ratio of the major axis diameter to the thickness (major axis diameter/thickness) was 1.1. The scanning electron microphotograph of the above metal hydroxide solid solution is shown in FIG. 6. In addition, as a result of a powder X-ray diffraction on the metal hydroxide solid solution, the diffraction pattern thereof was the same as that of magnesium hydroxide except that the diffraction pattern slightly shifted to a lower angle side. Consequently, it is found that the solid solution had a Cadmium hydroxide type habit of hexagonal system.

EXAMPLE 4

The metal hydroxide solid solution obtained in Example 1 was burned in an electric furnace for 2 hours at 900° C. so as to produce a metal oxide solid solution of the present invention.

Figure 7:
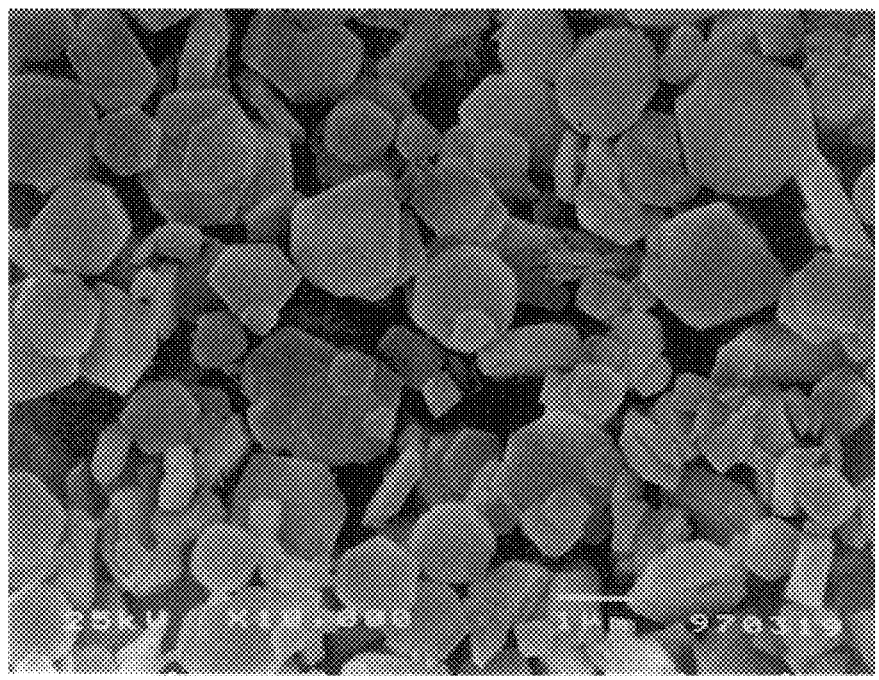
FIG. 7 is a scanning electron microphotograph showing the metal oxide solid solution of Example 4.

As a result of observations with a scanning electron microscope, the resultant metal oxide solid solution crystal was an octahedron in shape having pyramidal planes on its periphery. The major axis diameter of a basal plane was about 1.2 μm and the thickness between the basal planes was about 0.36 μm. Therefore, the ratio of the major axis diameter to the thickness (major axis diameter/thickness) was 3.3. The scanning electron microphotograph of the above metal oxide solid solution is shown in FIG. 7. In addition, as a result of a powder X-ray diffraction on the metal oxide solid solution, the diffraction pattern thereof was the same as that of magnesium oxide except that the diffraction pattern slightly shifted to a lower angle side. Consequently, it is found that the solid solution had a Cadmium hydroxide type habit of hexagonal system.

EXAMPLE 5

Instead of 10 liters of acetic acid (0.01 mol/liter) in EXAMPLE 1, 10 liters of hydrochloric acid (0.01 mol/liter) were used. Except for that, the metal hydroxide solid solution of the present invention was obtained in the same manner as EXAMPLE 1.

Figure 8:
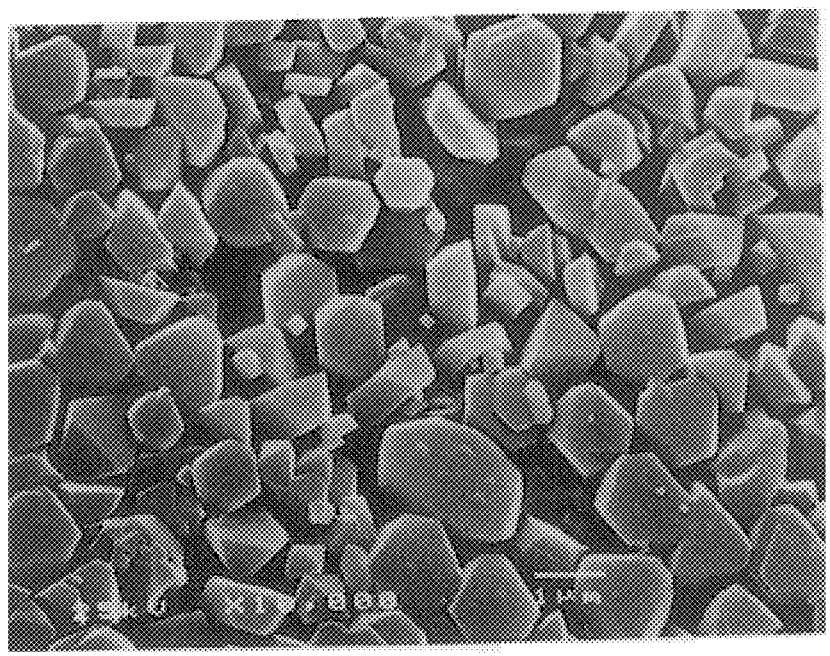
FIG. 8 is a scanning electron microphotograph showing the metal hydroxide solid solution of Example 5.

As a result of observations with a scanning electron microscope, the resultant metal hydroxide solid solution crystal was an octahedron in shape having pyramidal planes on its periphery. The major axis diameter of a basal plane was about 1.1 μm and the thickness between the basal planes was about 0.51 μm. Therefore, the ratio of the major axis diameter to the thickness (major axis diameter/thickness) was 2.2. The scanning electron microphotograph of the above metal oxide solid solution is shown in FIG. 8. In addition, as a result of a powder X-ray diffraction on the metal hydroxide solid solution, the diffraction pattern thereof was the same as that of magnesium hydroxide except that the diffraction pattern slightly shifted to a lower angle side. Consequently, it is found that the solid solution had a Cadmium hydroxide type habit of hexagonal system.

EXAMPLE 6

Instead of 10 liters of acetic acid (0.01 mol/liter) in EXAMPLE 1, 10 liters of nitric acid (0.26 mol/liter) were used. Except for that, the metal hydroxide solid solution of the present invention was obtained in the same manner as EXAMPLE 1.

Figure 9:
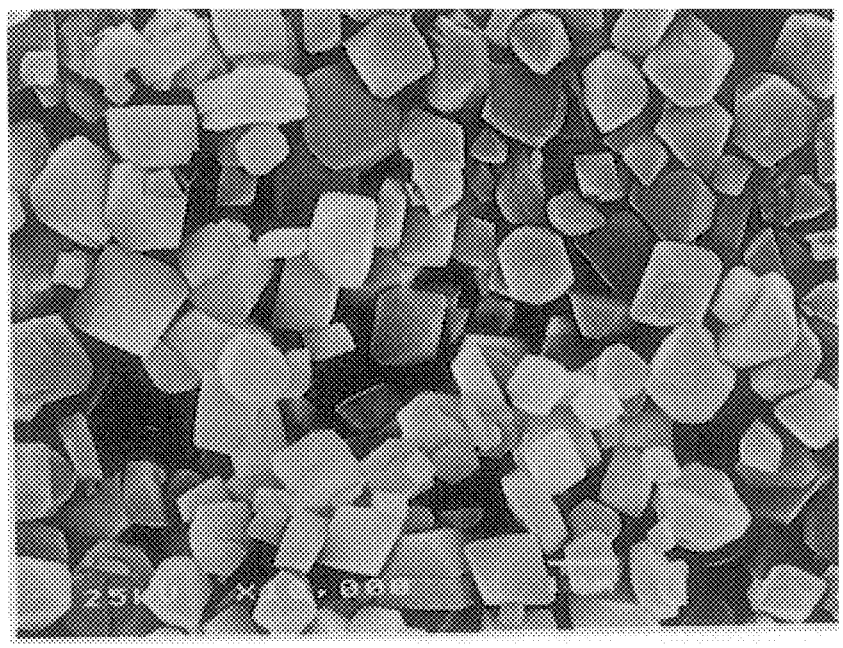
FIG. 9 is a scanning electron microphotograph showing the metal hydroxide solid solution of Example 6.

As a result of observations with a scanning electron microscope, the resultant metal hydroxide solid solution crystal was an octahedron in shape having pyramidal planes on its periphery. The major axis diameter of a basal plane was about 1.0 μm and the thickness between the basal planes was about 0.69 μm. Therefore, the ratio of the major axis diameter to the thickness (major axis diameter/thickness) was 1.4. The scanning electron microphotograph of the above metal oxide solid solution is shown in FIG. 9. In addition, as a result of a powder X-ray diffraction on the metal hydroxide solid solution, the diffraction pattern thereof was the same as that of magnesium hydroxide except that the diffraction pattern slightly shifted to a lower angle side. Consequently, it is found that the solid solution had a Cadmium hydroxide type habit of hexagonal system.

EXAMPLE 7

Instead of 10 liters of acetic acid (0.01 mol/liter) in EXAMPLE 1, 10 liters of aqueous solution composed of magnesium acetate (0.004 mol/liter) and zinc acetate (0.001 mol/liter) were used. Except for that, the metal hydroxide solid solution of the present invention was obtained in the same manner as EXAMPLE 1.

Figure 10:
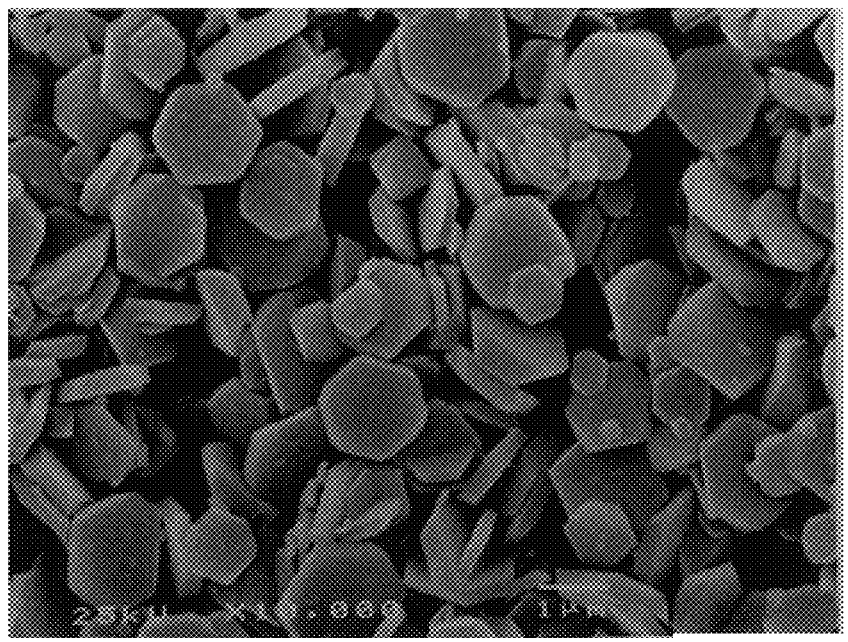
FIG. 10 is a scanning electron microphotograph showing the metal hydroxide solid solution of Example 7.

As a result of observations with a scanning electron microscope, the resultant metal hydroxide solid solution crystal was an octahedron in shape having pyramidal planes on its periphery. The major axis diameter of a basal plane was about 1.1 μm and the thickness between the basal planes was about 0.31 μm. Therefore, the ratio of the major axis diameter to the thickness (major axis diameter/thickness) was 3.5. The scanning electron microphotograph of the above metal oxide solid solution is shown in FIG. 10. In addition, as a result of a powder X-ray diffraction on the metal hydroxide solid solution, the diffraction pattern thereof was the same as that of magnesium hydroxide except that the diffraction pattern slightly shifted to a lower angle side. Consequently, it is found that the solid solution had a Cadmium hydroxide type habit of hexagonal system.

EXAMPLE 8

Instead of 10 liters of acetic acid (0.01 mol/liter) in EXAMPLE 1, 10 liters of aqueous solution composed of acetic acid (0.01 mol/liter) and nitric acid (0.01 mol/liter) were used. Except for that, the metal hydroxide solid solution of the present invention was obtained in the same manner as EXAMPLE 1.

Figure 11:
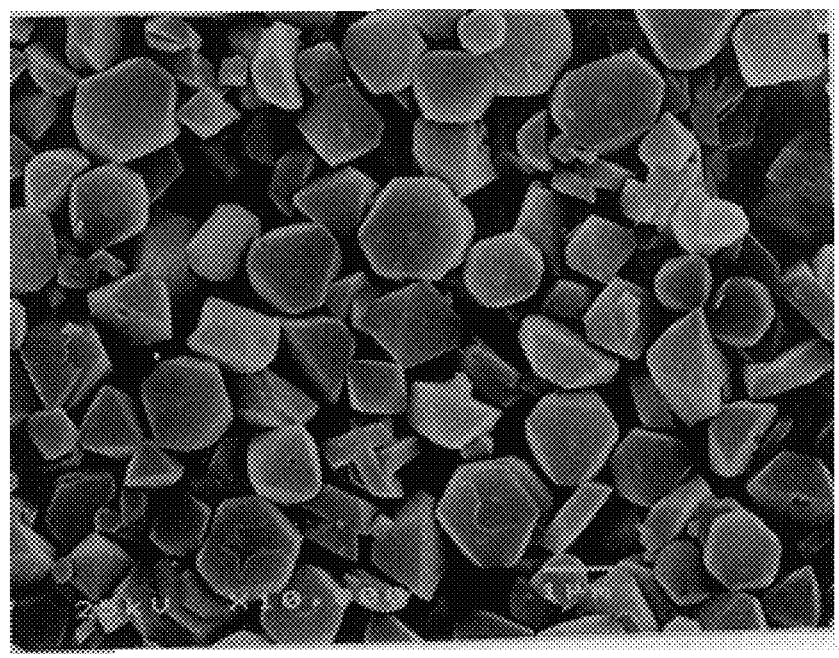
FIG. 11 is a scanning electron microphotograph showing the metal oxide solid solution of Example 8.

As a result of observations with a scanning electron microscope, the resultant metal hydroxide solid solution crystal was an octahedron in shape having pyramidal planes on its periphery. The major axis diameter of a basal plane was about 1.0 μm and the thickness between the basal planes was about 0.52 μm. Therefore, the ratio of the major axis diameter to the thickness (major axis diameter/thickness) was 1.9. The scanning electron microphotograph of the above metal oxide solid solution is shown in FIG. 11. In addition, as a result of a powder X-ray diffraction on the metal hydroxide solid solution, the diffraction pattern thereof was the same as that of magnesium hydroxide except that the diffraction pattern slightly shifted to a lower angle side. Consequently, it is found that the solid solution had a Cadmium hydroxide type habit of hexagonal system.

EXAMPLE 9

Instead of 10 liters of acetic acid (0.01 mol/liter) in EXAMPLE 1, 10 liters of aqueous solution composed of acetic acid (0.01 mol/liter) and magnesium nitrate (0.005 mol/liter) were used. Except for that, the metal hydroxide solid solution of the present invention was obtained in the same manner as EXAMPLE 1.

Figure 12:
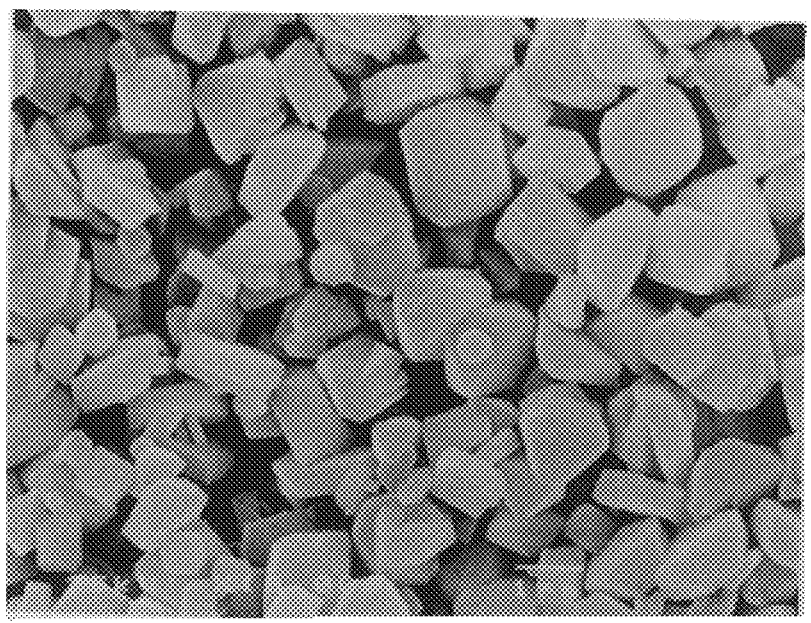
FIG. 12 is a scanning electron microphotograph showing the metal oxide solid solution of Example 9.

As a result of observations with a scanning electron microscope, the resultant metal hydroxide solid solution crystal was an octahedron in shape having pyramidal planes on its periphery. The major axis diameter of a basal plane was about 1.2 μm and the thickness between the basal planes was about 0.59 μm. Therefore, the ratio of the major axis diameter to the thickness (major axis diameter/thickness) was 2.0. The scanning electron microphotograph of the above metal oxide solid solution is shown in FIG. 12. In addition, as a result of a powder X-ray diffraction on the metal hydroxide solid solution, the diffraction pattern thereof was the same as that of magnesium hydroxide except that the diffraction pattern slightly shifted to a lower angle side. Consequently, it is found that the solid solution had a cadmium hydroxide type habit of hexagonal system.

COMPARATIVE EXAMPLE 1

20 liters of a mixed solution of magnesium nitrate and zinc nitrate ($Mg^{2+}$=1.6 mol/liter and $Zn^{2+}$=0.4 mol/liter)

were poured into a 50-liter reaction vessel, and 20 liters of Ca (OH)$_2$ (2.0 mol/liter) were added thereto with stirring for reaction. The thus obtained white precipitate then was filtered, washed with water and dried. The dried material was milled with a ball mill and burned in an electric furnace for 2 hours at 1200° C. The burned material was milled with the ball mill and passed through a 200-mesh sieve by a wet method. The resultant burned material was added to a 20-liter vessel containing 10 liters of acetic acid (0.15 mol/liter) in such a manner that the oxide concentration was 100 g/liter. The resultant material was stirred with a propeller blade type stirrer at a rotating speed for propeller blades of 4 m/s, and subjected to hydration treatment for 4 hours at 90° C. The reactant was passed through a 500-mesh sieve, and subsequently was filtered, washed with water and dried so as to produce a dried material.

Figure 13:
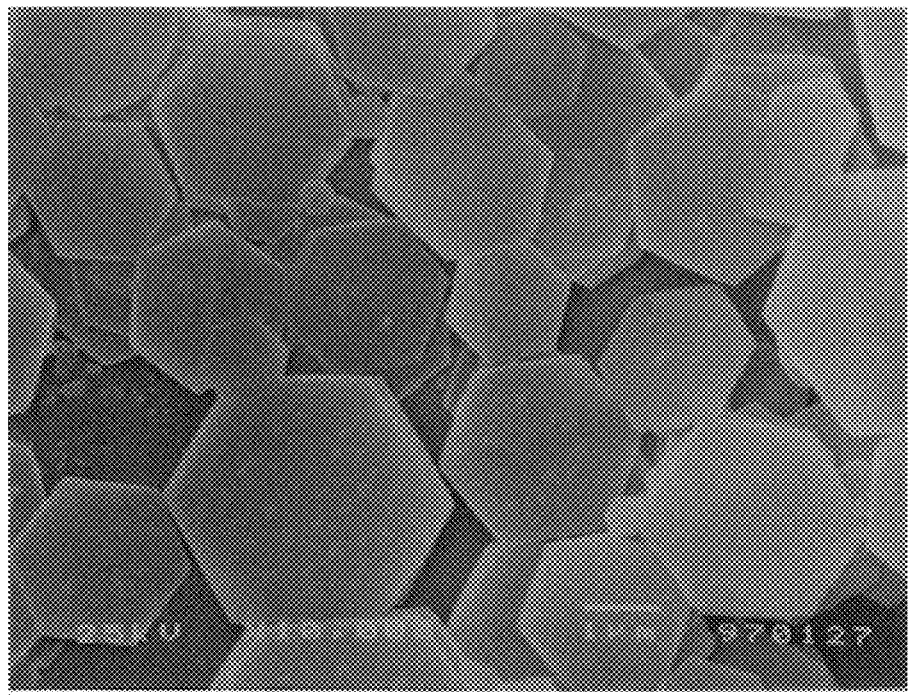
FIG. 13 is a scanning electron microphotograph showing the metal oxide solid solution of Comparative Example 1.

As a result of observations with a scanning electron microscope, the resultant dried material had a thin and hexagonal-prism crystal form. The major axis diameter of a basal plane was about 5.5 μm and the thickness between the basal planes was about 0.40 μm. Therefore, the ratio of the major axis diameter to the thickness (major axis diameter/thickness) was 13.8. The scanning electron microphotograph of the above metal hydroxide solid solution is shown in FIG. 13. In addition, as a result of a powder X-ray diffraction on the metal hydroxide solid solution, the diffraction pattern thereof was the same as that of magnesium hydroxide except that the diffraction pattern slightly shifted to a lower angle side.

COMPARATIVE EXAMPLE 2

1 liter of a mixed solution of magnesium nitrate and zinc nitrate (Mg$^{2+}$=0.9 mol/liter and Zn$^{2+}$=0.1 mol/liter) was poured into a 3-liter reaction vessel, and 1 liter of NaOH (2.04 mol/liter) was added thereto with stirring for reaction. The reactant then was emulsified into an aqueous solution of sodium chloride having a chlorine ion concentration of 1 mol/liter. Thereafter, the reactant was charged into a 3-liter autoclave equipped with a stirrer and was subjected to hydrothermal treatment for 2 hours at 50° C., followed by filtration, washing with water and drying. The dried material thus was obtained.

Figure 14:
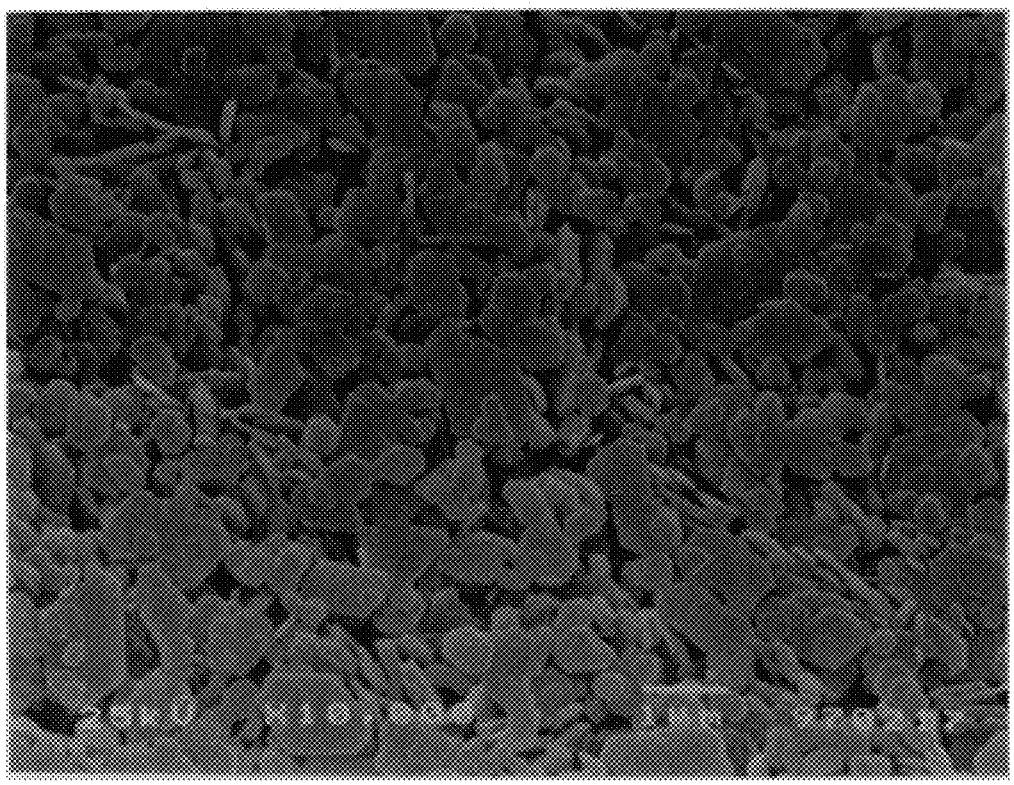
FIG. 14 is a scanning electron microphotograph showing the metal hydroxide solid solution of Comparative Example 2.

As a result of observations with a scanning electron microscope, the thus obtained dried material had a thin and hexagonal-prism crystal form. The major axis diameter of a basal plane was about 0.66 μm and the thickness between the basal planes was about 0.18 μm. Therefore, the ratio of the major axis diameter to the thickness (major axis diameter/thickness) was 3.7. The scanning electron microphotograph of the above metal hydroxide solid solution is shown in FIG. 14. In addition, as a result of a powder X-ray diffraction on the metal hydroxide solid solution, the diffraction pattern thereof was the same as that of magnesium hydroxide except that the diffraction pattern slightly shifted to a lower angle side.

EFFECT OF THE INVENTION

As described hereinbefore, in the present invention, the crystal form as a completely different crystal habit from the thin and hexagonal-prism crystal of the conventional metal hydroxide solid solution, and, in addition, crystal growth in the direction of the thickness is excellent. For this reason, unlike the conventional metal hydroxide solid solutions, when the metal hydroxide solid solution of the present invention is kneaded into a synthetic resin as an additive, fluidity and processability of the resin are improved and the molding speed is improved, by which productivity becomes excellent while the filling property is also improved. As a result, dispersibility in the resin becomes good, and when the metal hydroxide solid solutions of the present invention are used as additives for flame retardants, ultraviolet ray absorbents, reinforcing materials, radiating agents and the like, for resins, they may exhibit those functions sufficiently.

According to the present invention, in the case that the major axis diameter of the basal plane is 0.1 to 10 μm in average, when such is kneaded into a synthetic resin as an additive, fluidity and processability are further improved so that the productivity in resin molding and the like becomes excellent.

In addition, according to the present invention, in the case where M$^{2+}$ in the above formulae (1) and (2) is Zn$^{2+}$, the degree of whiteness is improved and also the ultraviolet ray absorbency becomes excellent by solid-solution Zn$^{2+}$ in Mg(OH)$_2$ and MgO, respectively.

What is claimed is:

1. A metal hydroxide solid solution represented by the following formula (1);

$$Mg_{1-x}M^{2+}_x(OH)_2 \qquad (1)$$

wherein M$^{2+}$ denotes at least one divalent metal ion selected from Mn$^{2+}$, Fe$^{2+}$, Co$^{2+}$, Ni$^{2+}$, Cu$^{2+}$ and Zn$^{2+}$ and x denotes a number in the range of 0.01≦x<0.5, with a crystal habit of an octahedron comprising upper and lower parallel basal planes and six peripheral pyramidal planes, the pyramidal planes consisting of upward-inclined planes and downward-inclined planes which are alternatively located, the ratio of the major axis diameter of the basal plane to the thickness between the upper and lower basal planes (major axis diameter/thickness) being 1 to 9.

2. The metal hydroxide solid solution according to claim 1, wherein the average major axis diameter of the basal plane is 0.1 to 10 μm.

3. The metal hydroxide solid solution according to claim 1, wherein M$^{2+}$ in the above formula (1) is Zn$^{2+}$.

4. The metal hydroxide solid solution according to claim 2, wherein M$^{2+}$ in the above formula (1) is Zn$^{2+}$.

5. Metal oxide solid solution represented by the following formula (2):

$$Mg_{1-x}M^{2+}_yO \qquad (2)$$

wherein M$^{2+}$ denotes at least one divalent metal ion selected from Mn$^{2+}$, Fe$^{2+}$, C$^{2+}$, Ni$^{2+}$, Cu$^{2+}$ and Zn$^{2+}$ and x denotes a number in the range of 0.01≦x<0.5, with a crystal form of an octahedron comprising upper and lower parallel basal planes and six peripheral pyramidal planes, the pyramidal planes consisting of upward-inclined planes and downward-inclined planes which are alternatively located, the ratio of the major axis diameter of the basal plane to the thickness between the upper and lower basal planes (major axis diameter/thickness) being 1 to 9.

6. The metal oxide solid solution according to claim 5, wherein the average major axis diameter of the basal plane is 0.1 to 10 μm.

7. The metal oxide solid solution according to claim 5, wherein M$^{2+}$ in the above formula (2) is Zn$^{2+}$.

8. The metal oxide solid solution according to claim 6, wherein M$^{2+}$ in the above formula (2) is Zn$^{2+}$.

9. A process for producing metal hydroxide solid solution represented by the following formula (1);

$$Mg_{1-x}M^{2+}{}_x(OH)_2 \quad (1)$$

wherein $M^{2+}$ denotes at least one divalent metal ion selected from $Mn^{2+}$, $Fe^{2+}$, $Co^{2+}$, $Ni^{2+}$, $Cu^{2+}$ and $Zn^{2+}$ and x denotes a number in the range of $0.01 \leq x < 0.5$, with a crystal habit of an octahedron comprising upper and lower parallel basal planes and six peripheral pyramidal planes, the pyramidal planes consisting of upward-inclined planes and downward-inclined planes which are alternatively located, the ratio of the major axis diameter of the basal plane to the thickness between the upper and lower basal planes (major axis diameter/thickness) being 1 to 9, wherein a composite metal oxide represented by the following formula (3) is hydrated in an aqueous medium, in which 0.1 to 6 mol%, based on the composite metal oxide, of at least one member selected from the group consisting of carboxylic acid, metal salt of carboxylic acid, inorganic acid and metal salt of inorganic acid coexists, with stirring whit a blade stirrer rotating at a tip speed of not less than 5m/sec:

$$Mg_{1-x}M^{3+}{}_x O \quad (3)$$

wherein $M^{2+}$ denotes at least one divalent metal ion selected from $Mn^{2+}$, $Fe^{2+}$, $co^{2+}$, $Ni^{2+}$, $Cu^{2+}$ and $Zn^{2+}$ and x denotes a number in the range of $0.01 \leq x < 0.5$.

10. The process for producing metal hydroxide solid solution according to claim 9, wherein the average major axis diameter of the basal plane is 0.1 to 10 μm.

11. The process for producing metal hydroxide solid solution according to claim 9, wherein $M^{2+}$ in the above formula (3) is $Zn^{2+}$.

12. The process for producing metal hydroxide solid solution according to claim 10, wherein $M^{2+}$ in the above formula (3) is $Zn^{2+}$.

13. The process for producing metal hydroxide solid solution according to claim 9, wherein the composite metal oxide represented by the formula (3) has a BET specific surface area of not more than 10 m²/g.

14. The process for producing metal hydroxide solid solution according to claim 10, wherein the composite metal oxide represented by the formula (3) has a BET specific surface area of not more than 10 m²/g.

15. The process for producing metal hydroxide solid solution according to claim 11, wherein the composite metal oxide represented by the formula (3) has a BET specific surface area of not more than 10 m²/g.

16. The process for producing metal hydroxide solid solution according to claim 12, wherein the composite metal oxide represented by the formula (3) has a BET specific surface area of not more than 10 m²/g.

17. A process for producing metal oxide solid solution represented by the following formula (2)

$$Mg_{1-x}M^{2+}{}_x O \quad (2)$$

wherein $M^{2+}$ denotes at least one divalent metal ion selected from $Mn^{2+}$, $Fe^{2+}$, $Co^{2+}$ $Ni^{2+}$, $Cu^{2+}$ and $Zn^{2+}$ and x denotes a number in the range of $0.01 \leq x < 0.5$, with a crystal form of an octahedron comprising upper and lower parallel basal planes and six peripheral pyramidal planes, the pyramidal planes consisting of upward-inclined planes and downward-inclined planes which are alternatively located, the ratio of the major axis diameter of the basal plane to the thickness between the upper and lower basal planes (major axis diameter/thickness) being 1 to 9, wherein a composite metal oxide represented by the following formula (3) is hydrated in an aqueous medium, in which 0.1 to 6 mol%, based on the composite metal oxide, of at least one member selected from the group consisting of carboxylic acid, metal salt of carboxylic acid, inorganic acid and metal salt of inorganic acid coexists, with stirring with a blade stirrer rotating at a tip speed of not less than 5m/sec, and then burned at not less than 400° c:

$$Mg_{1-x}M^{2+}{}_x O \quad (3)$$

wherein $M^{2+}$ denotes at least one divalent metal ion selected from $Mn^{2+}$, $Fe^{2+}$, $Co^{2+}$, $Ni^{2+}$, $Cu^{2+}$ and $Zn^{2+}$ and x denotes a number in the range of $0.01 \leq x < 0.5$.

18. The process for producing metal oxide solid solution according to claim 17, wherein the average major axis diameter of the basal plane is 0.1 to 10 μm.

19. The process for producing metal oxide solid solution according to claim 17, wherein $M^{2+}$ in the above formula (3) is $Zn^{2+}$.

20. The process for producing metal oxide solid solution according to claim 18, wherein $M^{2+}$ in the above formula (3) is $Zn^{2+}$.

21. The process for producing metal oxide solid solution according to claim 17, wherein the composite metal oxide represented by the formula (3) has a BET specific surface area of not more than 10 m²/g.

22. The process for producing metal oxide solid solution according to claim 18, wherein the composite metal oxide represented by the formula (3) has a BET specific surface area of not more than 10 m²/g.

23. The process for producing metal oxide solid solution according to claim 19, wherein the composite metal oxide represented by the formula (3) has a BET specific surface area of not more than 10 m²/g.

24. The process for producing metal oxide solid solution according to claim 20, wherein the composite metal oxide represented by the formula (3) has a BET specific surface area of not more than 10 m²/g.

* * * * *

UNITED STATES PATENT AND TRADEMARK OFFICE
CERTIFICATE OF CORRECTION

PATENT NO. : 6,254,847 B1  
DATED : July 3, 2001  
INVENTOR(S) : Hirofumi Kurisu et al.

Page 1 of 1

It is certified that error appears in the above-identified patent and that said Letters Patent is hereby corrected as shown below:

<u>Claim 5,</u>  
Line 47, change "$_yO$" to -- $_xO$ --; and  
Line 49, change "$C^{2+}$" to -- $Co^{2+}$ --.

<u>Claim 9,</u>  
Line 8, change "$co^{2+}$" to -- $Co^{2+}$ --; and  
Line 23, change "$M^{3+}$" to -- $M^{2+}$ --.

Signed and Sealed this

Twenty-sixth Day of March, 2002

Attest:

*Attesting Officer*

JAMES E. ROGAN  
*Director of the United States Patent and Trademark Office*